Patented Dec. 6, 1927.

1,651,458

UNITED STATES PATENT OFFICE.

FRIEDRICH KAYSER AND KARL SCHRANZ, OF ELBERFELD, NEAR COLOGNE-ON-THE-RHINE, GERMANY, ASSIGNORS TO WINTHROP CHEMICAL COMPANY, INC., OF NEW YORK, N. Y.

PHARMACEUTICAL PRODUCT.

No Drawing. Application filed February 4, 1926, Serial No. 86,051, and in Germany February 7, 1925.

Our invention relates to the manufacture and production of a new product being chemically the hitherto unknown benzyloxyethanol having most probably the formula.

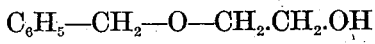

It is a valuable analgetic and anæsthetic and is useful in the treatment of scab.

It is a limpid oil boiling at 132°–135° C., under a pressure of 15 mm.

It can be obtained by treating benzyl alcohol with sodium and treating the sodium benzylate with glycol chlorhydrin CH$_2$Cl—CH$_2$.OH.

In order to illustrate our invention more fully the following example is given, the parts being by weight: 23 parts of sodium are added to 200 parts of warm benzyl alcohol whilst stirring and subsequently 80 parts of glycol chlorhydrin are added. The sodium chloride is filtered off and the filtrate is submitted to a fractional distillation.

The benzyloxyethanol distills at 132–135° C. under a pressure of 15 mm.

Our new product can also be obtained by treating 150 parts of glycol with 56 parts of potassium hydroxide and adding to the resulting glycolate 127 parts of benzylchloride at 90–100° C. The potassium chloride is removed and the benzyloxyethanol is isolated as above described.

We claim:

The herein described benzyloxyethanol having most probably the formula

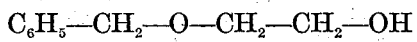

being a limpid oil boiling at 132–135° C. under a pressure of 15 mm. and being a good analgetic and anæsthetic and useful in the treatment of scab.

FRIEDRICH KAYSER.
KARL SCHRANZ.